(12) United States Patent
Angus (10) Patent No.: US 9,817,654 B2
(45) Date of Patent: Nov. 14, 2017

(54) SYSTEM AND METHOD FOR COMMUNICATION OF SOFTWARE

(71) Applicant: Ian G. Angus, Mercer Island, WA (US)

(72) Inventor: Ian G. Angus, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 15/051,170

(22) Filed: Feb. 23, 2016

(65) Prior Publication Data

US 2017/0242680 A1 Aug. 24, 2017

(51) Int. Cl.
| | |
|---|---|
| *G06F 9/44* | (2006.01) |
| *G05D 1/00* | (2006.01) |
| *G05D 3/00* | (2006.01) |
| *G06F 7/00* | (2006.01) |
| *G06F 17/00* | (2006.01) |
| *G06F 9/445* | (2006.01) |
| *B60R 16/023* | (2006.01) |

(52) U.S. Cl.
CPC .............. *G06F 8/65* (2013.01); *B60R 16/023* (2013.01)

(58) Field of Classification Search
None
See application file for complete search history.

(56) References Cited

U.S. PATENT DOCUMENTS

| | | | | |
|---|---|---|---|---|
| 7,151,985 B2* | 12/2006 | Tripmaker | ................ | G06F 8/65 701/3 |
| 7,908,042 B2* | 3/2011 | Brinkley | .............. | G08G 5/0013 342/29 |
| 2002/0111720 A1* | 8/2002 | Holst | ........................ | G06F 8/61 701/3 |
| 2009/0198712 A1 | 8/2009 | Sims, III et al. | | |
| 2014/0236394 A1 | 8/2014 | Kumar et al. | | |
| 2016/0098266 A1* | 4/2016 | Martin | .................... | G06F 8/665 717/171 |

OTHER PUBLICATIONS

Ramsey, Boeing 787: Integration's Next Step, Avionics Magazine, http://www.aviationtoday.com/av/commercial/Boeing787IntegrationsNextStep_932.html#.VsyMaPkrKUk; Jun. 1, 2005, (6 pages).

(Continued)

*Primary Examiner* — Lewis A Bullock, Jr.
*Assistant Examiner* — Mark Gooray
(74) *Attorney, Agent, or Firm* — Toler Law Group, PC (57) ABSTRACT

A vehicle includes at least one programmable computing device including a memory configured to store instructions that are executable by a processor. The vehicle also include a software loader configured to modify or replace the instructions based on a loadable software part. The vehicle includes a data interface and a loadable software part memory. The vehicle further includes a switch coupled to the data interface, to the loadable software part memory, and to software loader. While the switch is in a first position, a first data path between the data interface and the loadable software part memory is enabled and a second data path between the loadable software part memory and the software loader is disabled. While the switch is in a second position, the second data path is enabled and the first data path is disabled.

20 Claims, 5 Drawing Sheets

(56) References Cited

OTHER PUBLICATIONS

Network Extension Device (NED); Teledyne Controls; http://www.teledynecontrols.com/productsolution/ned/overview.asp; 2016, (1 page).
Adams, Boeing: Integrated Avionics Takes Another Step Forward, Avionics Magazine, http://www.aviationtoday.com/av/commercial/BoeingIntegratedAvionicsTakesAnotherStepForward_907.html#.VsyJ2fkrKUk; Jun. 1, 2003, (5 pages).
Extended European Search Report, Application No. 16204190, dated Jun. 9, 2017, 7 pages.

* cited by examiner

SYSTEM AND METHOD FOR COMMUNICATION OF SOFTWARE

FIELD OF THE DISCLOSURE

The present disclosure is generally related to communication of software.

BACKGROUND

Improvements in technology have led to an increasing number of computerized systems on board vehicles, such as aircraft, automobiles, ships, and so forth. Certain control systems have been improved by automation through the use of computing systems. As technology continues to improve, software on board such computing systems may be upgraded or replaced. Due to the importance of such computing systems within vehicles, ensuring the authenticity of software used to upgrade or replace existing control system software is important.

SUMMARY

In a particular implementation, a vehicle includes at least one programmable computing device including a memory configured to store instructions that are executable by a processor. The vehicle also include a software loader configured to modify or replace the instructions based on a loadable software part. The vehicle includes a data interface and a loadable software part memory. The vehicle further includes a switch coupled to the data interface, to the loadable software part memory, and to software loader. While the switch is in a first position, a first data path between the data interface and the loadable software part memory is enabled and a second data path between the loadable software part memory and the software loader is disabled. While the switch is in a second position, the second data path is enabled and the first data path is disabled In another particular implementation, a method includes, while a switch of a vehicle is in a first position, receiving data corresponding to a loadable software part via a first data path between a first data interface of the vehicle and a loadable software part memory of the vehicle. A second data path between the loadable software part memory and a software loader of the vehicle is disabled while the switch is in the first position. The method also includes storing the data at the loadable software part memory while the switch of the vehicle is in the first position. The method further includes sending the data via the second data path to the software loader while the switch is in the second position. The first data path is disabled while the switch is in the second position.

The features, functions, and advantages that have been described can be achieved independently in various implementations or may be combined in yet other implementations, further details of which are disclosed with reference to the following description and drawings.

DETAILED DESCRIPTION

Implementations disclosed herein enable improved software security for upgrading (e.g., adding new software), fixing (e.g., modifying existing software), or replacing software of a programmable computing device on board a vehicle. As used herein, a software part may refer to a portion of or an entirety of software executable by a programmable computing device. In particular, one or more systems described herein include a switchable software memory (e.g., a software memory coupled to a switch) on board a vehicle. For example, the software memory may be accessible to an external system via an interface while the switch is in a first position. To illustrate, data (e.g., a software part) can be received from the external system via the interface and stored at the software memory while the switch is in the first position. The software memory may be accessible to a software loader on board the vehicle and may not be accessible via the interface while the switch is in a second position. Thus, while the switch is in the second position the software loader may access the data at the software memory, but the software memory cannot receive other data via the interface.

Software parts received at the software loader may be inspected by the software loader prior to be being provided to the programmable computing device. For example, the software loader may be configured to inspect the software parts using a security check (e.g., an integrity check or a digital signature check). To illustrate, the software loader may perform one or more security checks on data from the software memory to check (or test) an integrity, an authenticity, or a combination thereof, of the data (e.g., the software part). As portions of the data are verified or after the all of the data is verified by the software loader, the software loader may provide the verified data to be installed at the programmable computing device on board the vehicle to upgrade, fix, or replace existing software of the programmable computing device. Accordingly, the switchable software memory (e.g., the switch and the software memory) enables the software loader to perform security checks without requiring the software loader to include storage, such as a buffer, having sufficient capacity to store all of the data (e.g., the entire software part). Additionally, the switchable software memory may alleviate read/write race conditions and hazards associated with concurrent operations. To illustrate, the switchable software memory may prevent a concurrent read and write operation by not being accessible to an external system that is attempting to provide a software part to the vehicle (e.g., writing to a memory) at a same time that a software loader is reading from the memory in order to perform security checks. Thus, the switchable software memory may not allow concurrent read and write operations, thus preventing data corruption that may result from concurrent read and write operations.

Additionally or alternatively, the vehicle may include a network guard that may be configured to inspect and filter non-software data, such as non-software data packets. Software data packets may not have an inspectable format because of software variability, which may make software data packets more difficult to inspect and filter as compared to non-software data packets. The network guard may approve non-software data to be delivered to one or more devices of the vehicle, such as the programmable computing device.

In some implementations, the switchable software memory may receive the data from an external system (e.g., a system off board the vehicle) via a first port and the network guard may communicate with a second external system via a different port. In other implementations, the network guard 134 may communicate with the second external system via the first port. Thus, data communication between the vehicle and the external systems can be performed via the network guard which may be configured to inspect and filter the non-software data packets. Therefore, the software parts may be sent via a port that is distinct from a port used for data communications and may be inspected prior to being installed at the programmable computing device.

Figure 1:
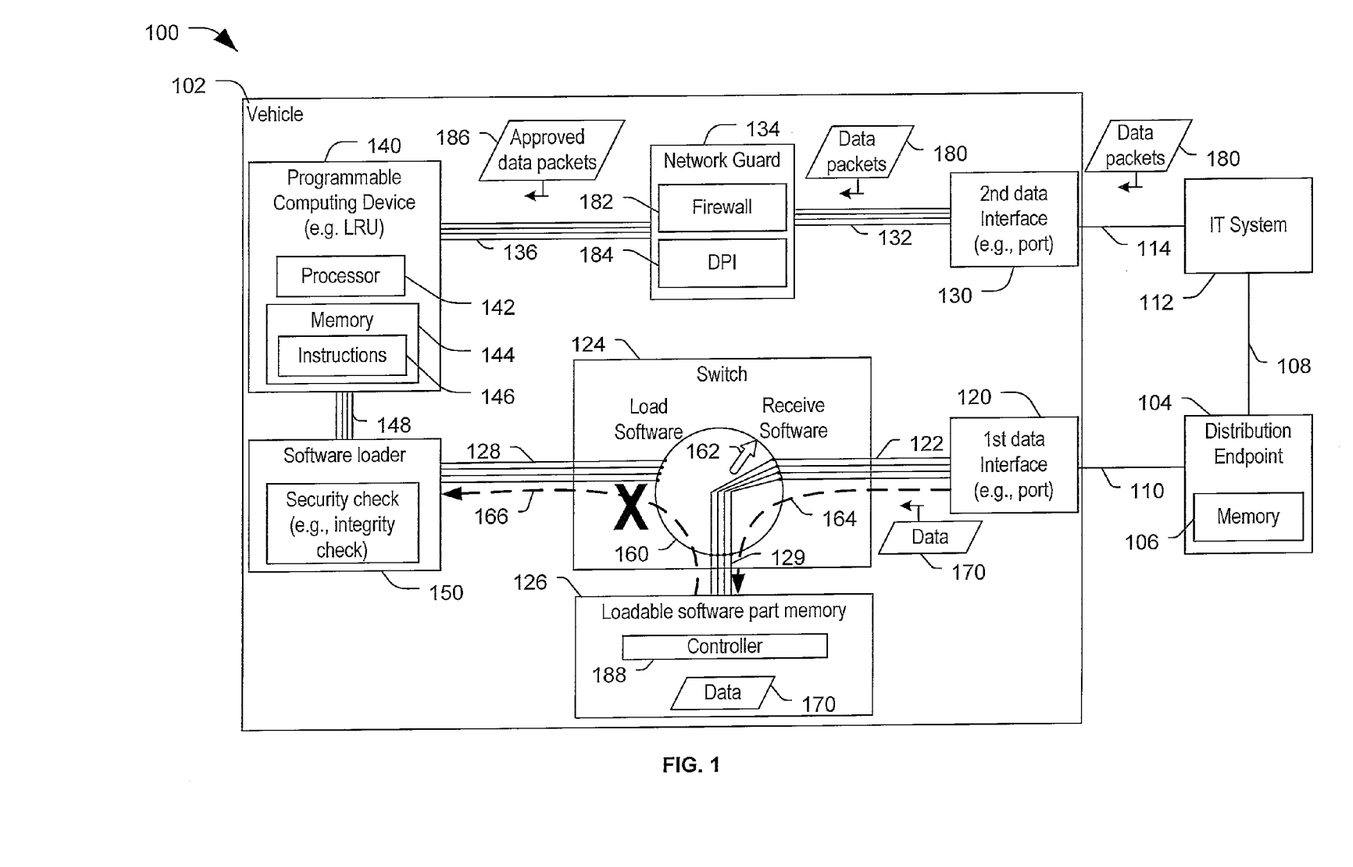
FIG. 1 is a diagram that illustrates a first configuration of a system for software delivery.

FIG. 1 illustrates an example of a system 100 that includes a vehicle 102. The vehicle 102 may receive software and/or data from one or more external systems, one or more internal systems, or a combination thereof. In a particular implementation of the system 100, the vehicle 102 may include or correspond to an aircraft, an automobile, a train, a motorcycle, a bus, a ship or boat, a rocket, a spacecraft, an autonomous vehicle, or another vehicle, as illustrative, non-limiting examples.

The vehicle 102 includes a programmable computing device 140, a software loader 150, a switch 124, a loadable software part memory 126, and a first data interface 120. The vehicle 102 may also include a network guard 134 and a second data interface 130. Although the vehicle 102 is illustrated as including the network guard 134 and the second data interface 130, in other implementations the network guard 134 and the second data interface 130 may be omitted.

The programmable computing device 140 may include a processor 142 and a memory 144. The memory 144 may store instructions 146 (e.g., a software part) that are executable by the processor 142 to perform various operations of the programmable computing device 140. For example, the operations may include vehicle control operations, vehicle monitoring or analysis operations, communications operations, vehicle sub-systems monitoring or analysis operations, emergency operations, or a combination thereof, as illustrative, non-limiting examples. The programmable computing device 140 may include or correspond to a line replaceable unit (LRU) of the vehicle 102 or a component of an LRU. The LRU may be a modular, replaceable hardware component of the vehicle 102. For example, an LRU may include or correspond to a flight management system, a transponder, an engine component, a sensor, or a combination thereof, as illustrative, non-limiting examples.

The programmable computing device 140 may be coupled to the software loader 150 via a first bus 148 and may be coupled to the network guard 134 via a second bus 136. The programmable computing device 140 may be configured to receive data (e.g., data 170), such as a software part, from a first external device of a first system via the first data interface 120 and may be configured to receive data packets (e.g., data packets 180) from a second external device of a second system via the second data interface 130. The first external device and the second external device may be the same device or different devices, as described further herein. Additionally, the first system and the second system may be the same system or different systems.

The software loader 150 may also be coupled to a switch 124 via a third bus 128. The software loader 150 may be configured to access data via the third bus 128 and to inspect the data. The software loader 150 may be configured to provide data via the first bus 148 to be installed at the memory 144 of the programmable computing device 140. For example, the software loader 150 may upgrade, fix, or replace the instructions 146 based on data (e.g., the data 170) stored at the loadable software part memory 126 via the first bus 148, as described further with reference to FIG. 2.

The switch 124 may be coupled to the loadable software part memory 126 via a fourth bus 129 and may be coupled to the first data interface 120 via a fifth bus 122. The switch 124 may be switchable between multiple positions, such as a receive software position (e.g., a first position) and a load software position (e.g., a second position). The switch 124 may be configured to selectively couple the loadable software part memory 126 to one of the software loader 150 or the first data interface 120. For example, while the switch 124 is in the receive software position, a first data path 164 is provided (e.g., enabled) between the first data interface 120 and the loadable software part memory 126. Thus, data 170 received from an external system at or via the first data interface 120 may be provided to the loadable software part memory 126 via the first data path 164. The first data interface 120 may include or correspond to a hardware interface, a software interface, or a combination thereof. Additionally, while the switch 124 is in the receive software position, a second data path 166 from the loadable software part memory 126 to the software loader 150 is disabled. Accordingly, the software loader 150 may not be able to access the data 170 at the loadable software part memory 126 while the switch 124 is in the receive software position. The software loader 150 may be able to access the data 170 at the loadable software part memory 126 while the switch 124 is in the load software position, as described with reference to FIG. 2.

The switch 124 may be located on board the vehicle 102 and may be accessible to authorized personnel (e.g., maintenance personnel) and inaccessible to unauthorized personnel. For example, the switch 124 may be located in a cockpit of the vehicle 102, on an exterior of the vehicle 102, or in a maintenance area of the vehicle 102. Additionally, the switch 124 may not be located in a portion of the vehicle 102 accessible to the general public or passengers, such as a passenger compartment of the vehicle 102. In some implementations, the switch 124 may be locked or may be located in a restricted area. For example, the switch 124 may not be accessible without a key or passcode or an area of the vehicle 102 where the switch 124 is located may not be accessible without the key or the passcode.

The switch 124 may be manually operated (e.g., physically and independently of software). The receive software position (e.g., the first position) is illustrated in FIG. 1 as shown by a position indicator 162. In a particular implementation illustrated in FIG. 1, the switch 124 may include a rotatable dial 160. The rotatable dial 160 may be manually operated between the receive software position (e.g., the first position) and the load software position (e.g., the second position). Although the switch 124 is illustrated as including the rotatable dial 160 in FIG. 1, the switch 124 may include or correspond to a manual two-position switch, such as a toggle switch or a push-button switch. In a particular implementations, the switch 124 may include a mechanical component operable to move between the first position and the second position via manual actuation.

Additionally, in event of a failure (e.g., an electrical short or a loss of power) the switch 124 may be immovable and may prevent switching between the multiple positions.

Accordingly, software parts may not be stored at the loadable software part memory 126 and loaded to the programmable computing device until the switch 124 is repaired or replaced. In some implementations, in an event where the switch 124 is damaged or tampered with, the switch 124 may revert to a default position, such as the receive software position or the load software position. For example, the switch 124 may be sealed and may include a circuit to check if a seal of the switch 124 is intact or uncompromised. In an event that the seal is broken or compromised, the switch 124 may revert to the default position. To illustrate, the switch 124 may revert to the receive software position in response to detecting that the seal is broken or compromised.

The loadable software part memory 126 may be configured to store data. The loadable software part memory 126 may include or correspond to a volatile memory, a non-volatile memory, or a combination thereof. In a particular implementation, the loadable software part memory 126 may include or correspond to a storage device. The loadable software part memory 126 may receive the data 170 while the switch 124 is in the receive software position (e.g., the first position). In a particular implementation, the loadable software part memory 126 is not able to receive data while the switch 124 is in the load software position (e.g., the second position). In some implementations, the loadable software part memory 126 may include a controller, such as a loadable software part memory controller 188. The loadable software part memory controller 188 may be configured to control the loadable software part memory 126. For example, the loadable software part memory controller 188 may be configured to receive data at, store data at, erase data at, and send data from the loadable software part memory 126. Although the loadable software part memory 126 is illustrated as a single memory, the loadable software part memory 126 may include multiple memories.

The first data interface 120 may be located on board the vehicle 102. In a particular implementation, the first data interface 120 may be located in a secure area of the vehicle 102. In another implementation the first data interface may be located in a non-secure area of the vehicle 102. The first data interface 120 (e.g., a first port) may be configured to be coupled to the distribution endpoint 104 via a connection 110. For example, the connection 110 may include a wired connection, a wireless connection, or a combination thereof. The connection 110 may include one or more of a Wi-Fi connection, a USB connection, an Ethernet connection, an Institute of Electrical and Electronics Engineers (IEEE) 1394 connection (e.g., a fire wire connection), mobile ad hoc network (MANET) connection, an optical connection, or a combination thereof, as illustrative, non-limiting examples.

The first data interface 120 may be configured to receive data from one or more external systems, one or more internal systems, or a combination thereof, and to provide the data to the loadable software part memory 126. For example, the first data interface 120 may receive the data 170 from the distribution endpoint 104 and may provide the data 170 to the loadable software part memory 126 while the switch 124 is in the receive software position.

Although the distribution endpoint 104 is illustrated as being external to the vehicle 102 in FIG. 1, in some implementations the distribution endpoint 104 may be located on board the vehicle 102. The distribution endpoint 104 may include or correspond to a computer, a router, or a gateway, as illustrative, non-limiting examples. The distribution endpoint 104 may include a memory 106 configured to store data (e.g., the data 170) received from one or more external systems (e.g., the IT system 112), one or more internal systems, received directly via a port (not shown), or a combination thereof. The memory 106 may include or correspond to a volatile memory, a non-volatile memory, or a combination thereof. Although the memory 106 is illustrated as a single memory, the memory 106 may include multiple memories. In some implementations, the distribution endpoint 104 may be configured to perform a security check on the data stored at the memory 106, such as a digital signature check.

The distribution endpoint may be coupled to the IT system 112 (e.g., a device of the IT system 112) via a connection 108. The connection 108 may be a wired connection, a wireless connection, or a combination thereof. For example, the connection 108 may be a Wi-Fi connection, a USB connection, an Ethernet connection, an IEEE 1394 connection (e.g., a fire wire connection), a MANET connection, an optical connection, or a combination thereof, as illustrative, non-limiting examples. The distribution endpoint 104 may retrieve (or receive) data (e.g., the data 170) from the IT system 112 via a wide area network (WAN), such as the internet. As another example, the distribution endpoint 104 may retrieve (or receive) data from the IT system 112 via a mobile internet protocol (MIP) network, a MANET, a local area network (LAN), a virtual private network (VPN), or an aeronautical telecommunications network (ATN). Accordingly, the IT system 112 may be proximate to the vehicle 102 or may be remote from the vehicle 102.

The network guard 134 may be coupled to the programmable computing device 140 and to the second data interface 130 (e.g., the second port). For example, the network guard 134 may be coupled to the programmable computing device 140 via the second bus 136. Additionally, in the example illustrated in FIG. 1 the network guard 134 is coupled to the second data interface 130 via a sixth bus 132. The network guard 134 may enable the systems of the vehicle 102, such as the programmable computing device 140 to communicate with one or more external systems via data packets, such as the data packets 180. The network guard 134 may include a firewall 182, an inspection module, such as a deep packet inspection module 184, or a combination thereof.

The network guard 134 may be configured to inspect the data packets 180 received from off board the vehicle 102. Examples of the data packets 180 may include data packets associated with a status report of the vehicle 102, associated with instrumentation of the vehicle 102, or associated with communications to or from the vehicle 102, or a combination thereof, as illustrative, non-limiting examples. In some implementations, the network guard 134 may inspect the data packets 180 to determine whether the data packets 180 satisfy various criteria stored at a memory of the network guard 134 (not shown). The criteria may include whether the data packets 180 contain executable data, whether the data packets 180 are associated with an approved sender or source, or whether the data packets 180 have an approved format, as illustrative, non-limiting examples. For example, the network guard 134 may inspect one or more headers of the data packets 180 to determine whether the data packets 180 satisfy a criterion. To illustrate, the network guard 134 may be configured to inspect the one or more headers of the data packets 180 (or a portion of the data packets 180) and to identify a source internet protocol (IP) address associated with the data packets 180. The network guard 134 may determine whether the source IP address matches a list of trusted or verified IP addresses (stored at the memory of the network guard 134) before approving the data packets 180.

Additionally or alternatively, the network guard 134 may perform deep packet inspection and inspect data of the data packets 180 for non-compliant protocols or malware (e.g., a computer virus). To illustrate, the deep packet inspection module 184 may inspect data of the data packets 180 to identify any outdated protocols, executable data, malware, or a combination thereof, using criteria stored at the memory of the network guard 134. The network guard 134 may approve data packets that do not contain data conforming to one or more of the stored criteria.

The network guard 134 may provide approved data packets 186 to systems of the vehicle 102, such as the programmable computing device 140. For example, the network guard 134 may provide the approved data packets 186 to the programmable computing device 140. Thus, the network guard 134 may provide components of the vehicle 102 (e.g., the programmable computing device) with the approved data packets 186 received via the second data interface 130 from one or more external systems. The network guard 134 may not provide software for installation via the second data interface 130 to the programmable computing device 140 by blocking (e.g., not approving software data packets) the software at the firewall 182 or the deep packet inspection module 184.

The second data interface 130 may be located on board the vehicle 102. In a particular implementation, the second data interface 130 may be located in a secure area of the vehicle 102. The second data interface 130 may be configured to receive data from one or more external systems, one or more internal systems, or a combination thereof and to provide the data to the network guard 134. For example, the second data interface 130 may receive the data packets 180 from the IT system 112 (e.g., the air traffic management system) and provide the data packets 180 to the network guard 134.

The second data interface 130 may be coupled to the IT system 112 via a connection 114. The connection 114 may be a wired connection, a wireless connection, or a combination thereof. For example, the connection 114 may be a Wi-Fi connection, a USB connection, an Ethernet connection, an IEEE 1394 connection (e.g., a fire wire connection), a MANET connection, an optical connection, or a combination thereof, as illustrative, non-limiting examples. The IT system 112 may be able to send the data packets 180 via the second data interface 130 to the network guard 134. In a particular implementation, the IT system 112 sends the data packets 180 in response to receiving data from the vehicle 102.

Thus, the vehicle 102 may be coupled to the IT system 112 directly (e.g., via a connection 114 to the second data interface 130), via a distribution endpoint 104 (e.g., via a connection 110 to the first data interface 120), or a combination thereof.

Although the system 100 is illustrated as having the distribution endpoint 104 coupled to the first data interface 120 and as having the IT system 112 coupled to the second data interface 130, the first data interface 120 and the second data interface 130 may be coupled to the distribution endpoint 104, the IT system 112, another system, or a combination thereof. For example, the IT system 112 may be coupled to the first data interface 120 independent of the distribution endpoint 104. In some implementations, the IT system 112 (or the distribution endpoint 104) may be configured to route data to the first data interface 120 or to the second data interface 130 based on a type of the data, such as software data or communications data. In a particular implementation, the distribution endpoint 104 may be a part of (or included in) the IT system 112. Accordingly, the vehicle 102 may receive data from one or more external systems, one or more internal systems, or a combination thereof, via the first data interface 120, the second data interface 130, or a combination thereof. In some implementations, the first data interface 120 and the second data interface 130 may be a single interface. For example, the network guard 134 may be coupled to the single interface and may be configured to route the software data to the loadable software part memory 126. As another example, a routing device (not shown) may be coupled to the single interface and may be configured to route the software data to the loadable software part memory 126 and the communications data to the network guard 134.

During operation of the system 100, the switch 124 may be set to the receive software position. The IT system 112 may send the data 170 to the distribution endpoint 104 via the connection 108. The distribution endpoint 104 may route or forward the data 170 to the first data interface 120 via the connection 110. In some implementations, the distribution endpoint 104 may perform a digital signature check on the data 170 before providing the data 170 to the loadable software part memory 126. In a particular implementation, the distribution endpoint 104 may forward or route the data 170 in response to receiving the data 170. In other implementations, the distribution endpoint 104 may receive data directly via a port or a connection, such as via a flash drive.

While the switch 124 is set to the receive software position, the first data path 164 is enabled, and the loadable software part memory 126 may store the data 170 received via the fifth bus 122 from the first data interface 120. Because the switch 124 is set to the receive software position, the second data path 166 is disabled (e.g., data may not be provided from the loadable software part memory 126 to the software loader 150).

Regardless or independent of the position of the switch 124, the IT system 112 may communicate the data packets 180 to the programmable computing device 140. The network guard 134 may determine whether the data packets 180 satisfy the security check. For example, the network guard 134 may filter the data packet(s) 180 using the firewall 182, may perform deep packet inspection on the data packets 180 using the deep packet inspection module 184, or both. The network guard 134 may approve the data packet(s) 180 that pass the security check and may provide the approved data packets 186 to the programmable computing device 140.

In some implementations, while a data path (e.g., the first data path 164 or the second data path 166) is enabled and a data transfer is active, the data transfer is severed when the switch 124 is moved from a first position to a second position. For example, when the switch 124 is moved from the receive software position to the load software position while the data 170 is being transferred from the distribution endpoint 104 to the loadable software part memory 126, the first data path 164 is disabled, and the transfer of the data 170 is terminated. As a transfer of the data 170 may be terminated prior to completion, the loadable software part memory 126, the loadable software part memory controller 188, the software loader 150, or a combination thereof, may be resilient to sudden and unexpected interruptions, to prevent data loss or corruption in the event of an interruption.

In some implementations, there might be a delay before a data path is terminated when the switch 124 is moved from one position to the next. For example, the first data path 164 may be disabled 10 milliseconds after the switch 124 is moved from the receive software position to the load software position. Additionally, when the switch 124 is moved from one position to another a delay signal may be generated by an electrical component of the vehicle 102 and may inform components of the system 100 of an upcoming interruption. For example, the switch 124 may send a delay signal to the loadable software part memory 126, the distribution endpoint 104, or both, indicating the first data path 164 is about to be disabled. The delay signal may provide the loadable software part memory 126, the distribution endpoint 104, or both, enough time to stop the data transfer and may prevent data loss or corruption.

In some implementations, only one data path may be enabled at any time. For example, the first data path 164 may not be enabled while the second data path 166 is enabled. Both the first data path 164 and the second data path 166 may be disabled for a period of time before either the first data path 164 or the second data path 166 is enabled. In a particular implementation, the switch 124 may have a standby position (e.g., a third position). The standby position may be between the receive software position (e.g., the first position) and the load software position (e.g., the second position). Thus, the switch 124 may go into the standby position when switching from the first position to the second position or from the second position to the first position. While the switch 124 is in the standby position, both the first data path 164 and the second data path 166 may be disabled.

In some implementations, the switch 124 may be included in a software load panel (not shown). The software load panel may prevent access to the switch 124. For example, the switch 124 may be accessible after opening the software load panel with a key or passcode. The software load panel may be located in a secure or restricted area of the vehicle 102. For example, the software load panel may be accessible to maintenance personal and may not be accessible to passengers. As an illustrative, non-limiting example, the software load panel may be located in a flight deck of the vehicle 102. In a particular implementation, the software load panel may be on the exterior of the vehicle 102.

Although the buses (e.g., the first bus, the second bus, etc.) are illustrated as multichannel (e.g., four channels) in FIG. 1, each bus may have more than or fewer than four channels. In a particular implementation, at least one bus may have a single channel.

Although the system 100 is illustrated as having only one programmable computing device 140 and one software loader 150, the system 100 may have multiple programmable computing devices, multiple software loaders, or both. For example, the system 100 may include multiple programmable computing devices (e.g., LRUs). Each programmable computing device may have its own dedicated software loader. As another example, there may be one or more software loaders and each software loader may correspond to (e.g., load software for) a set of one or more programmable computing devices.

In some implementations, the data 170 may indicate which particular programmable computing device of the multiple programmable computing devices is to have its software upgraded, fixed, or replaced with the data 170. For example, the data 170 may indicate that the software loader 150 is to modify or upgrade a first programmable computing device and a second programmable computing device of the multiple programmable computing devices with the data 170.

Thus, FIG. 1 illustrates a vehicle 102 that has a software part memory, such as the loadable software part memory 126, that enables security checking of software parts to be loaded to programmable computing devices of the vehicle 102, such as the programmable computing device 140. Additionally, the vehicle 102 is able to communicate other data via data packets with systems off board the vehicle 102 via a network guard 134. The network guard 134 while able to scan data packets (e.g., the data packets 180) that have a particular format, may be less adept at scanning and filtering certain types of data packets, such as software parts. For example, software part data packets may be too complex to scan or a variability between software part data packets may be too great to filter. As another example, the network guard 134 may not have enough memory to buffer the entire software part to check digital signatures. Thus, by offloading the inspecting or checking of software parts to a security check of the software loader 150, the network guard 134 can be simplified. Additionally, by providing a switch 124, vehicle security integrity can be maintained by ensuring that maintenance personnel are intentionally uploading software to be loaded to the programmable computing device 140 based on a position of the switch 124. Furthermore, the software loader 150 may have a reduced size and complexity relative to software loaders which receive software via a network connection, as the software loader 150 may read from a local memory instead of performing networking operations.

Figure 2:
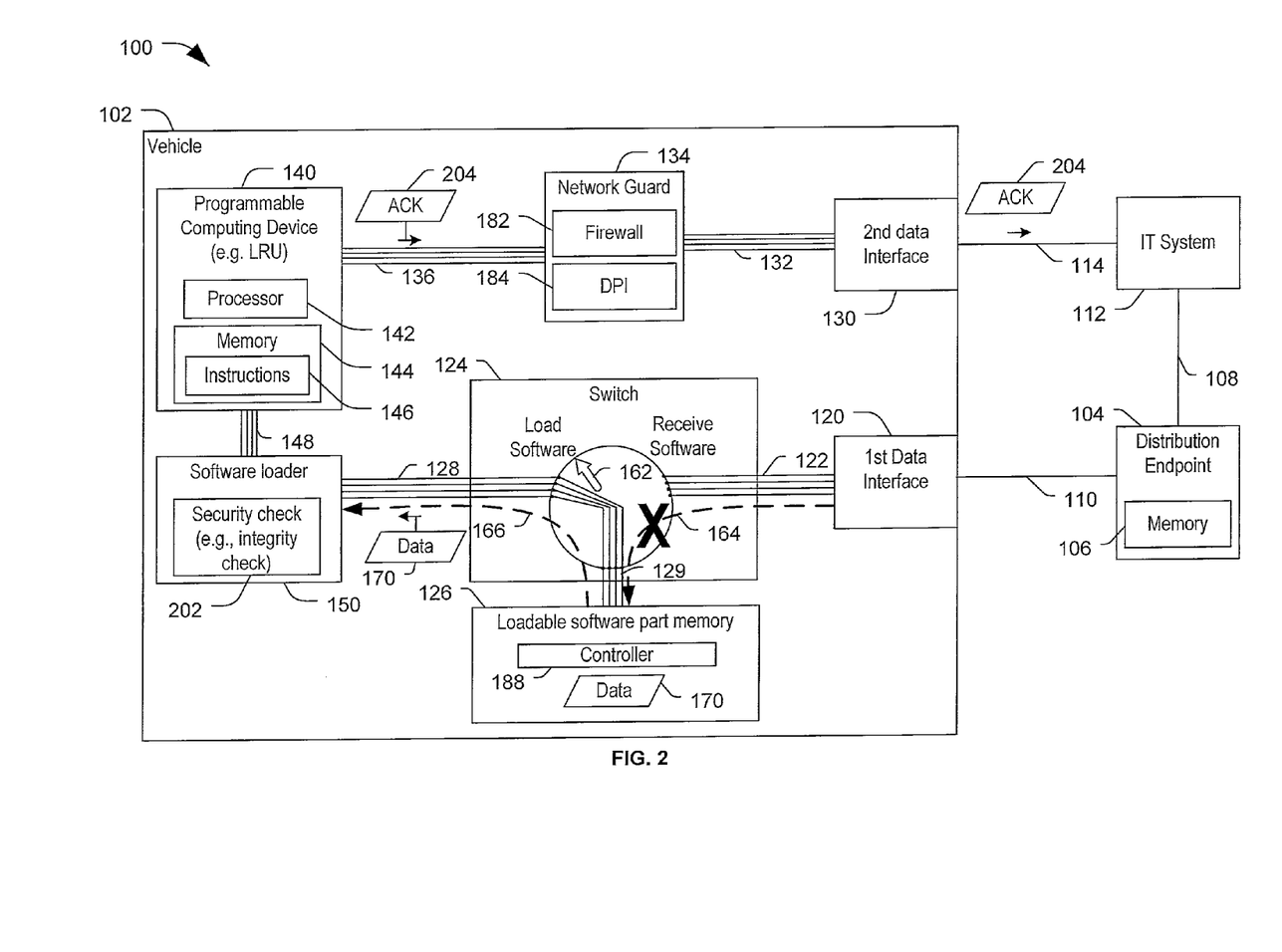
FIG. 2 is a diagram that illustrates a second configuration of the system for software delivery.

FIG. 2 includes another illustration of the system 100, in which the switch 124 is in a second position that corresponds to the load software position. For example, the switch 124 may be moved from the receive software position to the load software position after the data 170 has been stored at the loadable software part memory 126. While the switch 124 is in the load software position, the first data path 164 is disabled. Thus, the loadable software part memory 126 is not accessible to (or via) the first data interface 120. However, while the switch 124 is in the load software position, the second data path 166 is enabled. Thus, the software loader 150 is able to access and retrieve the data 170 from the loadable software part memory 126.

Additionally, while the switch 124 is in the load software position, the loadable software part memory 126 (e.g., the loadable software part memory controller 188) may send a data load enable signal to the software loader 150 via the fourth bus 129 or via a different communication path (not shown), such as a dedicated data load enable signal path. The data load enable signal notifies the software loader 150 that data is available at the loadable software part memory 126 to be loaded by the software loader 150 to a system of the vehicle 102, such as the programmable computing device 140 of the vehicle 102. In response to receiving the data load enable signal, the software loader 150 may access the loadable software part memory 126 to access, retrieve, or both, the data 170 or a portion of the data 170. Additionally, a data path may be enabled in response to the data load signal and a position of the switch 124. For example, the second data path 166 may be enabled in response to the data load enable signal being received at the software loader 150 and the switch 124 being in the load software position. In other implementations, the data load enable signal may be generated by the switch 124 or another source. Additionally, the data load enable signal may cause the switch 124 to enable or disable a data path. For example, the switch 124 may disable the first data path 164, enable the second data path 166, or both, in response to receiving (or generating) the data load enable signal.

The software loader 150 may perform a security check 202 on the data 170 or the portion of the data 170 in the loadable software part memory 126. For example, the security check 202 may include an integrity check, a digital signature check, or a combination thereof, associated with the data 170. The software loader 150 may buffer all of the data 170 to perform the integrity check or the digital signature check. In some implementations, the integrity check may include a cryptographic integrity check. For example, the software loader 150 may be initialized with a key prior to performing the cryptographic integrity check. The key may be a public key and the key may be included in a digital certificate. In other implementations, the key may be a private key. The software loader 150 may use the key to perform the cryptographic integrity check on the data 170. Since the data 170 is loaded in the loadable software part memory 126 prior to the software loader 150 having access to the data 170, there is no issue with a read/write runaway condition or race condition where the distribution endpoint 104 is trying to access or modify the data 170 at the same time as the software loader 150 is trying to access or modify the data 170.

After performing the security check 202 and the data 170 is approved or satisfied the security check, the software loader 150 may use or install the data 170 or a portion of the data 170 to upgrade, fix, or replace the instructions 146 of the programmable computing device 140. When the data 170 (or a portion thereof) is not approved or does not satisfied the security check, the data 170 (or the portion thereof) may be deleted, overwritten, or otherwise discarded. Additionally, the software loader 150 may generate a report when the data 170 (or the portion thereof) is not approved or does not satisfied the security check. The report may indicate a data load failure or error. The software loader 150 may send the report to an external system via the network guard 134.

In response to the instructions 146 being updated or replaced based on the data 170, the software loader 150 or the programmable computing device 140 may send an acknowledgement 204 to the one or more external systems off board the vehicle 102 indicating that the software has been correctly installed at the programmable computing device 140. Although the acknowledgement 204 is illustrated as going to the IT system 112 in FIG. 2, in other implementations, the acknowledgement 204 may be sent directly to the distribution endpoint 104. Alternatively, when the acknowledgement 204 is be sent to the IT system 112, the IT system 112 may forward the acknowledgement 204 or information about the acknowledgement 204 to the distribution endpoint 104 via the network guard 134.

During operation of the system 100, the switch 124 may be set to the load software position from the receive software position. For example, the switch 124 may be manually activated by aircraft or maintenance personnel. As described with reference to FIG. 1, the data 170 was stored in the loadable software part memory 126 while the switch 124 was previously set to the receive software position. Since the switch 124 is set to the load software position, the second data path 166 may be enabled and the software loader 150 may access (e.g., read-only access) the data 170 at the loadable software part memory 126 via the third bus 128. The software loader 150 may perform a security check 202 on the data 170 at the loadable software part memory 126. For example, the software loader 150 may buffer the data 170 or a portion of the data 170 and perform a digital signature check on the buffered data. As another example, the software loader 150 may perform an integrity check on the data 170 using a stored key, such as the key acquired during the initialization process.

The software loader 150 may approve the data 170 in response to performing the security check 202. The software loader 150 may use or install the data 170 or a portion of the data 170 to upgrade, fix, or replace the instructions 146 of the programmable computing device 140. In some implementations, the data 170 may include multiple software parts. The software loader may be configured to select a particular loadable software part to install (e.g., a portion of the data 170) of the multiple software parts based on the data 170.

In response to the instructions 146 being updated or replaced based on the data 170 or a portion of the data 170, the software loader 150 or the programmable computing device 140 may send the acknowledgement 204 to the IT system 112 via the second data interface 130.

Additionally, the IT system 112 may send second data (not shown) to the distribution endpoint 104 via the connection 108. The distribution endpoint 104 may attempt to route or forward the second data to the first data interface 120 via the connection 110. Since the switch 124 is set to the load software position, the first data path 164 is disabled, and the distribution endpoint 104 may not be able to send the second data (e.g., may not have write access). Thus, the loadable software part memory 126 may not be able to store the second data. In a particular implementation, the distribution endpoint 104 may store the second data at the memory 106. For example, the distribution endpoint 104 may be configured to store any data received from the IT system 112. As another example, the distribution endpoint 104 may store the second data at the memory 106 when the loadable software part memory 126 is not accessible to the distribution endpoint 104. To illustrate, while the switch 124 is in the load software position, the distribution endpoint 104 may store the second data at the memory 106.

Figure 3:
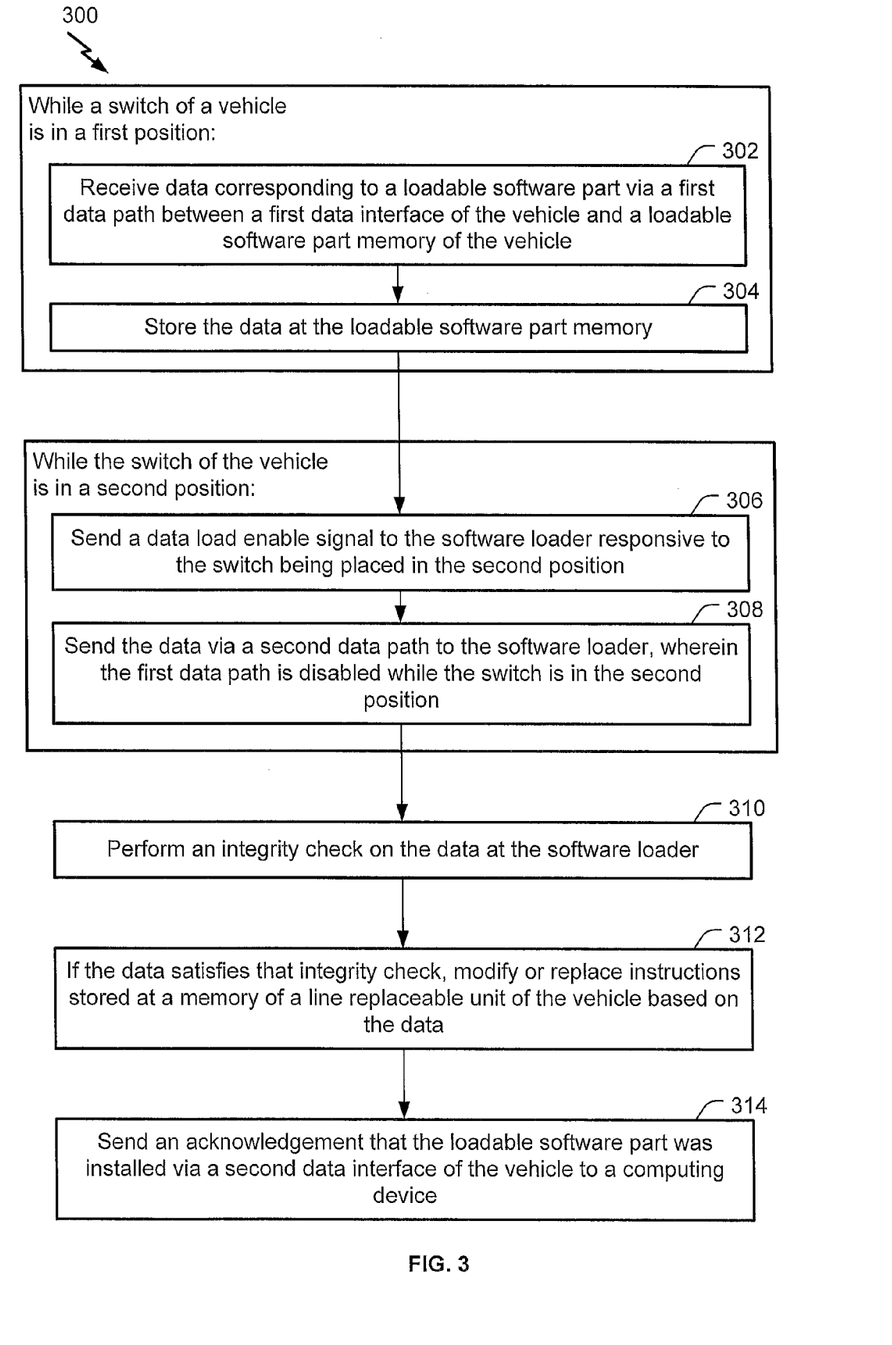
FIG. 3 is a flow chart of an example of a method of communicating software.

FIG. 3 illustrates a particular example of a method 300 of communicating software. The method 300 may be performed by the system 100 of FIGS. 1 and 2, the vehicle 102 of FIGS. 1 and 2. For example, the method 300 may be performed by the programmable computing device 140, the software loader 150, the switch 124, the loadable software part memory 126, the first data interface 120, or a combination thereof.

The method 300 includes, at 302, while a switch of a vehicle is in a first position, receiving data corresponding to a loadable software part via a first data path between a first data interface of the vehicle and a loadable software part memory of the vehicle. For example, referring to FIG. 1, while the switch 124 of the vehicle 102 is in the receive software position, the loadable software part memory 126 may receive the data 170 via the first data path 164 from the first data interface 120. In some implementations, the switch may include a mechanical component of the vehicle that is moved between the first position and the second position via manual actuation to enable a software load operation.

The method 300 includes, at 304, while the switch of the vehicle is in the first position, storing the data at the loadable software part memory. For example, the first position may include or correspond to the receive software position indicated by the position indicator 162 as depicted in FIG. 1.

The method 300 may include, at 306, while the switch of the vehicle is in a second position, sending a data load enable signal to the software loader responsive to the switch being placed in the second position. For example, the second position may include or correspond to the load software position indicated by the position indicator 162 as depicted in FIG. 2. The switch 124 may send a data load enable signal to the software loader 150 responsive to the switch 124 being placed in the load software position.

The method 300 includes, at 308, while the switch of the vehicle is in the second position, sending the data via a second data path to the software loader. The first data path is disabled while the switch is in the second position. For example, the second data path may include or correspond to second data path 166 of FIGS. 1 and 2. The first data path 164 may be disabled while the switch 124 is in the load software position, as described with reference to FIGS. 1 and 2. In some implementations, the first data path may correspond to a first data bus and the second data path may correspond to a second data bus. For example, the first data path 164 may correspond to the fifth bus 122, and the second data path 166 may correspond to the third bus 128.

The method 300 may include, at 310, performing an integrity check on the data at the software loader. For example, the software loader 150 may perform the security check 202 on the data 170, as described with reference to FIG. 2.

The method 300 may include, at 312, when the data satisfies the integrity check, modifying or replacing instructions stored at a memory of a line replaceable unit of the vehicle based on the data. For example, the instructions may include or correspond to the instructions 146 of FIGS. 1 and 2, and the memory may include or correspond to the memory 144 of FIGS. 1 and 2. The line replaceable unit may include or correspond to the programmable computing device 140. To illustrate, the instructions 146 of the programmable computing device 140 may be modified or replaced with the data 170.

The method 300 may include, at 314, sending an acknowledgement via a second data interface of the vehicle to a computing device. The acknowledgement may indicate that the loadable software part was installed. For example, the acknowledgement may include or correspond to the ACK 204 of FIG. 2 and may be sent via the second data interface, such as the second data interface 130 of FIGS. 1 and 2, to the IT system 112.

In some implementations, the method 300 may include receiving a plurality of data packets from a computing device via a second data interface of the vehicle. For example, the data packets may include or correspond to the data packets 180 of FIG. 1. The second data interface may be distinct from the first data interface. The method 300 may also include performing packet analysis of the plurality of data packets at a network guard device of the vehicle. For example, the network guard may include or correspond to the network guard of FIGS. 1 and 2. In some implementations, the packet analysis may include a deep-packet inspection of the plurality of data packets to determine whether the plurality of data packets include executable instructions. The method 300 may further include sending one or more data packets of the plurality of data packets to a line replaceable unit from the network guard device subject to the one or more of the data packets satisfying the packet analysis. In some implementations, the one or more data packets may satisfy the packet analysis when each of the one or more data packets has at least one of an expected format or an expected payload type. For example, the data packets that satisfy the packet analysis may include or correspond to the approved data packets 186 of FIG. 1.

Figure 4:
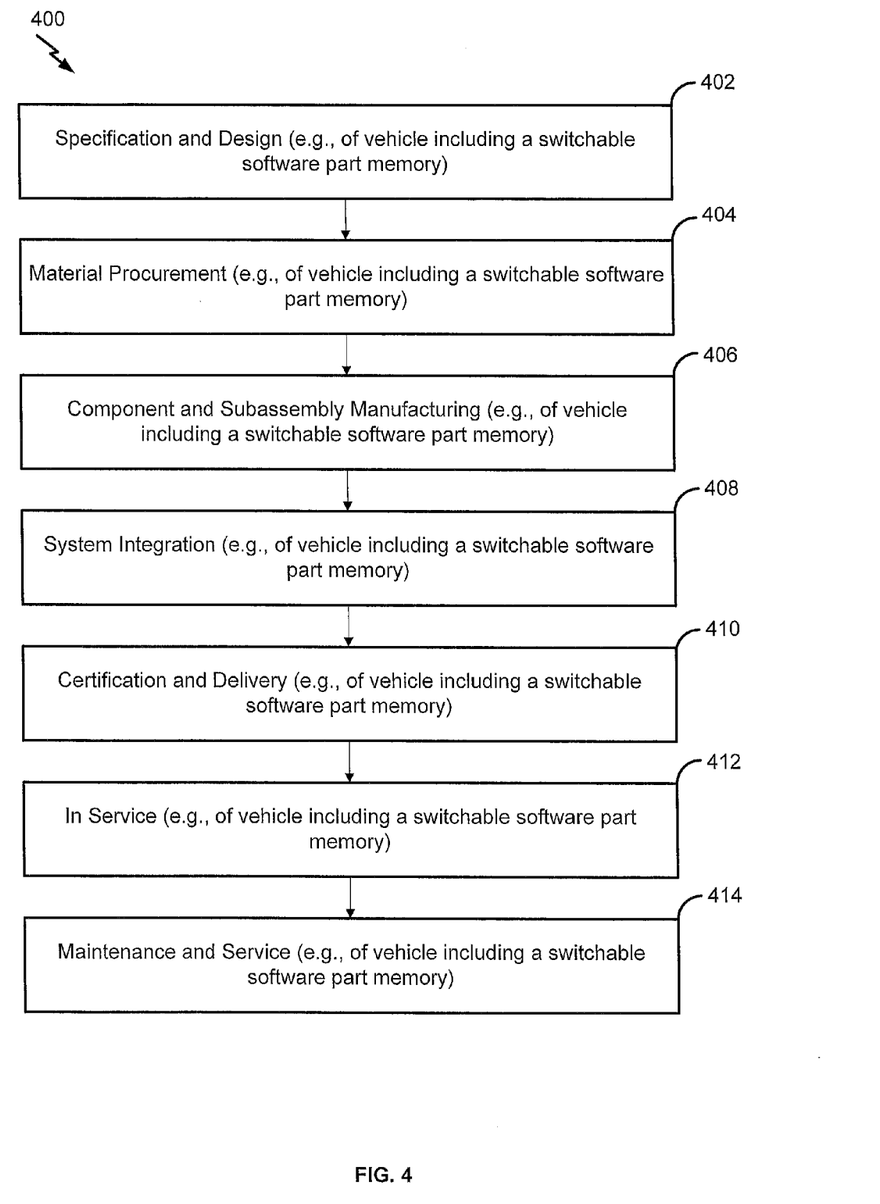
FIG. 4 is a flow chart of an example of a method of operating a system for software delivery.
Figure 5:
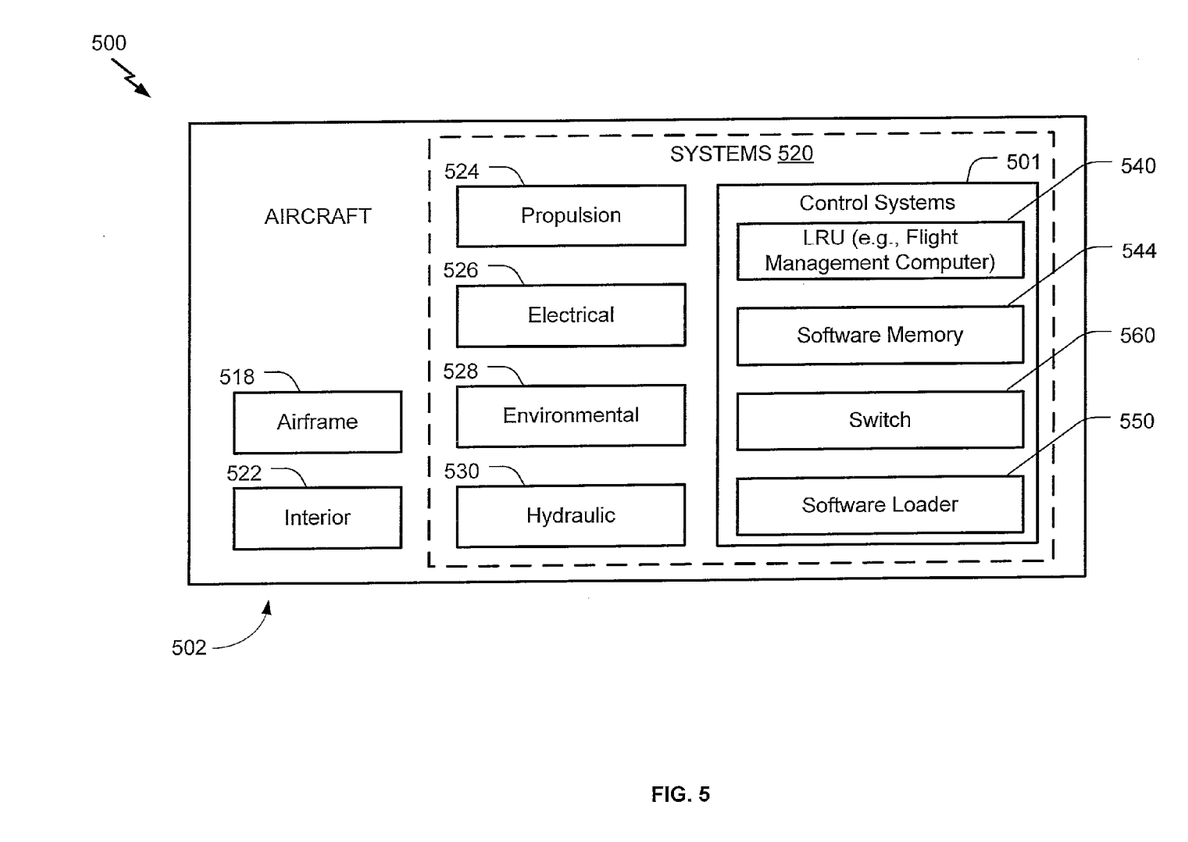
FIG. 5 is a block diagram of an illustrative implementation of a vehicle that includes components of a system for software delivery.

Referring to FIGS. 4 and 5, examples of the disclosure are described in the context of a vehicle manufacturing and service method 400 as illustrated by the flow chart of FIG. 4 and a vehicle system 500 as illustrated by the block diagram of FIG. 5. A vehicle produced by the vehicle manufacturing and service method 400 of FIG. 4 and a vehicle 502 of FIG. 5 may include aircraft, an automobile, a train, a motorcycle, a bus, a ship or boat, a rocket, a spacecraft, an autonomous vehicle, or another vehicle, as illustrative, non-limiting examples.

Referring to FIG. 4, a flowchart of an illustrative example of a method of operating a system for software delivery is shown and designated 400. During pre-production, the exemplary method 400 includes, at 402, specification and design of a vehicle, such as the vehicle 102 of FIG. 1 or a vehicle 502 described with reference to FIG. 5. During the specification and design of the vehicle, the method 400 may include, a switchable software part memory, a switch, or a combination thereof. The switchable software part memory and the switch may include or may correspond to the loadable software part memory 126 and the switch 124, respectively. At 404, the method 400 includes material procurement. For example, the method 400 may include procuring materials (such as the loadable software part memory 126 of FIGS. 1 and 2, the software loader 150 of FIGS. 1 and 2, the switch 124 of FIGS. 1 and 2, or a combination thereof) for the software delivery system.

During production, the method 400 includes, at 406, component and subassembly manufacturing and, at 408, system integration of the vehicle. The method 400 may include component and subassembly manufacturing (e.g., producing the loadable software part memory 126 of FIGS. 1 and 2) of the flight management system and system integration (e.g., coupling the software loader 150 to the switch 124) of the system for software delivery. At 410, the method 400 includes certification and delivery of the vehicle and, at 412, placing the vehicle in service. Certification and delivery may include certifying the system for software delivery. The method 400 may include placing the system for software delivery in service. While in service by a customer, the vehicle may be scheduled for routine maintenance and service (which may also include modification, reconfiguration, refurbishment, and so on). At 414, the method 400 includes performing maintenance and service on the vehicle. The method 400 may include performing maintenance and service of the system for software delivery. For example, maintenance and service of the system for software delivery may include replacing one or more of the loadable software part memory 126 of FIGS. 1 and 2, the software loader 150 of FIGS. 1 and 2, the switch 124 of FIGS. 1 and 2, or a combination thereof. As another example, maintenance and service of the system may also include upgrading, fixing, or replacing software.

Each of the processes of the method 400 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

A first portion of one of the methods of FIGS. 3 and 4 may be combined with at least a second portion of another one of the methods of FIGS. 3 and 4. For example, a first portion of the method 300 of FIG. 3 may be combined with a second portion of one of the method 300 of FIG. 3, the method 400 of FIG. 4, or a combination thereof.

Referring to FIG. 5, a block diagram of an illustrative implementation of a vehicle that includes components of a system for software delivery is shown and designated 500. For example, the vehicle 502 may include or correspond to the vehicle 102 of FIG. 1. To illustrate, the vehicle 502 may include an aircraft, as an illustrative, non-limiting example.

The vehicle may have been produced by at least a portion of the method 400 of FIG. 4. As shown in FIG. 5, the vehicle 502 (e.g., an aircraft) may include an airframe 518, an interior 522, and a plurality of systems 520 including control systems 501. The plurality of systems 520 may additionally include one or more of a propulsion system 524, an electrical system 526, an environmental system 528, or a hydraulic system 530. The control systems 501 may include components of the system 100 described with reference to FIG. 1, and may include an LRU 540 (e.g., a flight management computer), a software memory 544, a switch 560, and a software loader 550. The LRU 540 may include or correspond to the programmable computing device 140 of FIG. 1. The software memory 544 may include or correspond to the loadable software part memory 126 of FIG. 1. The switch 560 may include or correspond to the switch 124 of FIG. 1. The software loader 550 may include or correspond to the software loader 150 of FIG. 1. Any number of other systems may be included, such as a processor coupled to a memory (not shown). The processor may be configured to execute computer-executable instructions (e.g., a program of one or more instructions) stored in the memory. The instructions may include or correspond to instructions which when executed cause the processor to perform one or more operations of the methods of FIG. 3. Although an aerospace example is shown, the implementations described herein may be applied to other industries, such as the automotive industry.

Apparatus and methods included herein may be employed during any one or more of the stages of the method 400 of FIG. 4. For example, components or subassemblies corresponding to production process 408 may be fabricated or manufactured in a manner similar to components or subassemblies produced while the vehicle 502 is in service, at 412 for example and without limitation. Also, one or more apparatus implementations, method implementations, or a combination thereof may be utilized during the production stages (e.g., elements 402-410 of the method 400), for example, by substantially expediting assembly of or reducing the cost of the vehicle 502. Similarly, one or more of apparatus implementations, method implementations, or a combination thereof may be utilized while the vehicle 502 is in service, at 412 for example and without limitation, to maintenance and service, at 414.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A vehicle comprising:
   at least one programmable computing device, the at least one programmable computing device comprising a memory configured to store instructions that are executable by a processor;
   a software loader configured to modify or replace the instructions based on a loadable software part;
   a data interface;
   a loadable software part memory; and
   a switch coupled to the data interface, to the loadable software part memory, and to the software loader such that:
      while the switch is in a first position, a first data path between the data interface and the loadable software part memory is enabled and a second data path between the loadable software part memory and the software loader is disabled, and
      while the switch is in a second position, the second data path is enabled and the first data path is disabled.

2. The vehicle of claim 1, wherein the vehicle is an aircraft and the at least one programmable computing device is a component of a line replaceable unit of the aircraft.

3. The vehicle of claim 1, wherein the switch comprises a mechanical component operable to move between the first position and the second position via manual actuation.

4. The vehicle of claim 1, wherein the switch is configured to cause a data load enable signal to be sent to the software loader responsive to the switch being placed in the second position.

5. The vehicle of claim 1, wherein first data path corresponds to a first data bus and the second data path corresponds to a second data bus.

6. The vehicle of claim 1, further comprising a loadable software part memory controller configured to, while the switch is in the first position, receive data corresponding to a particular loadable software part from the data interface and to store the data in the loadable software part memory.

7. The vehicle of claim 6, wherein the data is not accessible to the software loader while the switch is in the first position.

8. The vehicle of claim 6, wherein the loadable software part memory controller is further configured to, while the switch is in the second position, retrieve the data from the loadable software part memory and send the data via the second data path to the software loader.

9. The vehicle of claim 8, wherein a device coupled to the data interface is not able to access the loadable software part memory and is not able to communicate with the loadable software part memory controller while the switch is in the second position.

10. The vehicle of claim 8, wherein the software loader is configured to perform a security check of the data.

11. The vehicle of claim 10, wherein the software loader is further configured to use the data to modify or replace the instructions subject to determining that the data passes the security check.

12. The vehicle of claim 1, wherein, while the switch is in the first position, a device coupled to the data interface has write access to the loadable software part memory; and while the switch is in the second position, the software loader has read-only access to the loadable software part memory.

13. A method comprising:
while a switch of a vehicle is in a first position:
receiving data corresponding to a loadable software part via a first data path between a first data interface of the vehicle and a loadable software part memory of the vehicle, wherein a second data path between the loadable software part memory and a software loader of the vehicle is disabled while the switch is in the first position; and
storing the data at the loadable software part memory; and
while the switch is in a second position, sending the data via the second data path to the software loader, wherein the first data path is disabled while the switch is in the second position.

14. The method of claim 13, further comprising, after sending the data to the software loader, performing an integrity check on the data and, when the data satisfies the integrity check, modifying or replacing instructions stored at a memory of a line replaceable unit of the vehicle based on the data.

15. The method of claim 13, wherein the switch comprises a mechanical component of the vehicle that is moved between the first position and the second position via manual actuation to enable a software load operation.

16. The method of claim 13, further comprising sending a data load enable signal to the software loader responsive to the switch being placed in the second position.

17. The method of claim 13, further comprising, after the software loader provides that loadable software part to a line replaceable unit, sending an acknowledgement that the loadable software part was installed via a second data interface of the vehicle to a computing device.

18. The method of claim 13, further comprising:
receiving a plurality of data packets from a computing device via a second data interface of the vehicle, the second data interface distinct from the first data interface;
performing packet analysis of the plurality of data packets at a network guard device of the vehicle; and
sending one or more data packets of the plurality data packets to a line replaceable unit from the network guard device subject to the one or more of the data packets satisfying the packet analysis.

19. The method of claim 18, wherein the packet analysis includes a deep-packet inspection of the plurality of data packets to determine whether the plurality of data packets include executable instructions.

20. The method of claim 18, wherein the one or more data packets satisfy the packet analysis when each of the one or more data packets has at least one of an expected format or an expected payload type.

* * * * *